United States Patent Office 3,841,967
Patented Oct. 15, 1974

3,841,967
PROCESS FOR THE PRODUCTION OF ZEAXANTHIN
Jaroslav Dasek, Yverdon, David Shepherd, Morges, and Knut Rude Traelnes, Renens, Switzerland, assignors to Societe d'Assistance Technique pour Produits Nestle S.A., Lausanne, Switzerland
No Drawing. Filed Oct. 18, 1972, Ser. No. 298,528
Claims priority, application Sweden, Oct. 27, 1971, 15,626/71; May 24, 1972, 7,664/72
Int. Cl. C12d 1/00
U.S. Cl. 195—29       18 Claims

ABSTRACT OF THE DISCLOSURE

Improved yields of zeaxanthin are obtained by culture of a zeaxanthin-producing microorganism of the *Flavobacter* genus under conditions whereby the culture medium contains a carbon source at a level of 15 to 35 mg./ml. and a substantially constant ratio between carbon and nitrogen sources in the medium is maintained. Particularly high yields of zeaxanthin are obtained by culture of mutants prepared by a novel mutation technique.

---

The present invention is concerned with the preparation of the yellow pigment zeaxanthin, or 3,3'-dihydroxy-β-carotene, by biosynthesis.

Zeaxanthin may for example be used as an additive in feeds for chickens to reinforce the yellow shade of the skin of the birds or to accentuate the colouring of egg yolks. The pigment may also be used as a colouring in the cosmetic industry.

Synthesis of pigments by certain microorganisms, especially of carotenoid pigments by bacteria of the *Flavobacter* genus, is a known phenomenon. However, the industrial preparation of these pigments by biosynthesis generally proves to be delicate operation, and the yields obtained, often very low, involve the use of very large quantities of culture medium if it is desired to obtain appreciable amounts of pigments.

It has now been found that improved yields of zeaxanthin may be obtained by culture of a zeaxanthin-producing microorganism of the genus *Flavobacter* under conditions whereby a substantially constant ratio is maintained between the amounts of carbon and nitrogen source present in the culture medium.

The present invention thus provides a process for preparing zeaxanthin by culture of a zeaxanthin-producing microorganism of the *Flavobacter* genus in which the microorganism is first cultured in a nutrient medium therefor until cells in a state of growth and zeaxanthin production are obtained, and the cells are then cultured at a temperature of 22–25° C. and with sufficient oxygenation, in an aqueous nutrient medium therefor containing at least one carbohydrate, at a level of 15 to 35 mg./ml. as assimilable carbon source and at least one source of assimilable amino nitrogen containing free amino acids, during the culture the respective amounts of carbon and amino nitrogen source present in the medium are maintained in a substantially constant ratio by progressively adding these substances, and culture is continued until a substantial amount of zeaxanthin is accumulated in the medium.

The term "zeaxanthin-producing microorganism of the *Flavobacter* genus" includes bacteria of this genus and their mutants. Particularly preferred are *Flavobacter* ATCC No. 21081, *Flavobacter* ATCC No. 21588 and *Flavobacterium aquatile* ATCC No. 11947. The expression "with sufficient oxygenation" signifies that the oxygen content of the culture medium is not below a threshold value below which it becomes a limiting factor for the growth rate of the microorganism under the conditions of culture. This oxygenation may be achieved for example by vigorous aeration and stirring of the culture medium. Finally, the term "nutrient medium" designates a culture medium containing assimilable substances necessary for the growth of the microorganism. These substances include, in particular, carbon and nitrogen sources and mineral salts. The nutrient medium may also contain optional additives such as vitamins, growth factors and trace elements.

The carbohydrate, which constitutes the principal source of assimilable carbon is preferably glucose, lactose or sucrose. The carbon source may also consist of a mixture of two or more carbohydrates.

Among the substances which may constitute the principal amino nitrogen source, preferred are corn steep liquor, yeast extracts, protein hydrolysates, in particular products obtained by acid or enzymatic hydrolysis of vegetable proteins such as soya or peanut proteins, and/or the casein hydrolysate called "tryptone." The amino nitrogen source may also contain a material prepared by acid or enzymatic hydrolysis of a biomass recovered as a by-product in the biosynthesis of a carotenoid pigment by culture of a bacterium of the *Flavobacter* genus, in particular by hydrolysis of a biomass of *Flavobacter* cultured for the production of zeaxanthin and from which the pigment has been extracted.

In carrying out the process according to the invention, a culture of a microorganism of the *Flavobacter* genus may be inoculated into a fermenter containing a nutrient medium (as defined). Growth of the microorganism is then sustained by assuring sufficient oxygen of the medium and maintaining an appropriate temperature and pH, for example 28 to 30° C. and 6.5 to 8.0, preferably 7.0 to 7.5, respectively. It is particularly advantageous to carry out this first stage of the culture in a medium containing more than 35 mg./ml. of carbon source.

When the cells have reached a stage of growth, preferably the exponential growth phase, as well as the stage of zeaxanthin production, culture is continued at a temperature of 22 to 25° C., with continuous oxygenation, whilst maintaining the carbon source level in the medium at 15 to 35 mg./ml. and a substantially constant ratio between the amounts of carbon and nitrogen sources present. This is most conveniently done by progressively adding a nutrient medium, of constant composition, containing the carbon and nitrogen in appropriate amounts and preferably in a weight ratio of between 1.6 and 3.4 to 1 (carbon to nitrogen). When the preferred procedure is used, involving carrying out the first stage of culture in a medium containing more than 35 mg./ml., the level of carbon source progressively decreases as this material is consumed by the organism. It has been observed that an initial carbon source concentration of 6 to 8% by weight is particularly advantageous, as the beginning of the stage of growth and zeaxanthin production coincides more or less with the time when the carbon source level has fallen to the range of 15 to 35 mg./ml. required for the second stage of culture. In other words, by starting the first stage of culture with a carbon source level of 6–8% by weight in the medium, the desired level of carbon source for the second stage is reached at about the same time as the phase of growth and zeaxanthin production, so that the second culture stage may be commenced immediately.

During this stage, the pH of the culture medium is adjusted between 6.5 and 8.0, preferably between 7.0 and 7.5. The adjustment of pH may be effected with alkaline substances such as aqueous solutions of sodium hydroxide, potassium hydroxide or ammonium hydroxide, or with ammonia gas. The two latter substances are preferably used as they also constitute sources of amino nitrogen assimilable by the microorganism.

Culture is then continued for a sufficient period of time to obtain a substantial quantity of zeaxanthin in the medium. Culture may also be continued after stopping progressive additions of nutrient substances, leaving the composition of the medium to develop according to the consumption of nutrient substances by the microorganism.

Experimental results have shown that, when the culture of the microorganism is effected according to this procedure, the production of zeaxanthin is notably higher than in a culture of the same microorganism effected under conventional conditions.

At the end of culture, the fermentation broth may be concentrated and the zeaxanthin extracted from the cells, for example with a polar organic solvent such as acetone or ethanol or a chlorinated solvent such as chloroform.

Alternatively, the biomass may be separated from the culture medium, for example by centrifugation, decantation or filtration. The biomass may be used as such, for example as an additive in chicken feeds, or it may also be extracted with a polar organic solvent.

Particularly advantageous results have been obtained by culturing, as described previously, mutants prepared by the action of 1-methyl-3-nitro-1-nitroso-guanidine, hereinafter designated as NTG, on bacteria of the *Flavobacter* genus by a novel mutation process characterised by the action of NTG on the bacterium in a solidified medium. A mutant of a zeaxanthin-producing *Flavobacter* may for example be prepared by diluting a culture of the organism in a sterile physiological solution and mixing the solution in appropriate proportions, in a petri dish, with an aqueous solution of NTG, for example with an equal volume of an aqueous solution of NTG containing 1 to 10 mg. of this substance per ml. Melted agar is then poured on the solution and carefully mixed. When the agar has solidified, the resulting solid medium is incubated, for example at a temperature of 25 to 28° C., until colonies appear in the solidified medium. The colonies are then taken up and replated several times on solid nutrient.

The resulting mutant may then be subjected to one or more further mutation treatments in solidified medium.

Experimental results have shown that such a mutation treatment, effected in a solidified medium with a mutagen such as NTG, provides, from bacteria of the *Flavobacter* genus, mutants which produce, in identical culture conditions, considerably higher quantities of zeaxanthin than those produced by mutants prepared according to conventional mutation processes from the same bacteria and with the same mutagen.

The invention is illustrated by the following Examples, in which the percentages are by weight.

Example 1

A culture is prepared from a strain of the *Flavobacter* genus (ATCC No. 21,588) and is inoculated at a level of 5% into an aqueous nutrient medium in a fermenter. The nutrient medium, previously sterilised at 120° C. for 40 minutes and cooled to 28° C. and having a pH, adjusted with ammonia, between 6.9 and 7.1, has the following composition:

|   | (Percent) |
|---|---|
| Glucose (separately sterilised in a concentrated solution) | 7.0 |
| Corn steep liquor | 1.6 |
| Casein hydrolysate (tryptone) | 0.8 |
| Yeast extract | 1.8 |
| Magnesium sulphate | 0.5 |
| Corn oil | 0.08 |
| Tap water, balance to 100%. | |

The microorganism is cultured in the fermenter at 28° C., with vigorous aeration and stirring, and with continuous adjustment of the pH of the medium between 7.2 and 7.3 by automatic addition of dilute aqueous ammonia.

Culture carried out under these conditions includes a lag phase of 6 to 7 hours, and production of zeaxanthin begins after 14 hours of culture.

When the glucose concentration of the fermentation medium drops, by decreasing values, to 25 mg./ml., that is 24 hours after the start of culture, the temperature of the medium is adjusted to 24° C. and a nutrient substrate which has been previously sterilised in a separate reservoir and of which the pH has been adjusted to 7.2, is progressively fed into the fermenter at a rate such that the glucose concentration of the medium remains substantially constant. The composition of the medium is as follows:

|   | (Percent) |
|---|---|
| Glucose | 32 |
| Corn steep liquor | 4.7 |
| Casein hydrolysate (tryptone) | 4.3 |
| Yeast extract | 5.5 |
| Tap water, balance to 100%. | |

This progressive addition is continued for 20 hours, the temperature of the medium being maintained at 24° C.

After a total culture time of 50 hours, the zeaxanthin content of the fermentation medium is determined. For this purpose, the biomass is separated from the nutrient substrate by centrifugation and the zeaxanthin is extracted from the cells with acetone. The zeaxanthin content of the acetone solution is determined colorimetically by comparison with standard solutions of synthetic zeaxanthin in the same solvent.

The zeaxanthin content of the fermentation medium is found to be 20 μg./ml.

By way of comparison, the same strain is cultured by a conventional method. It is inoculated at a level of 5% by volume into the same amount of nutrient medium. The medium has previously been sterilised and cooled to 28° C. and the pH adjusted between 6.9 and 7.1; it has the following composition:

|   | (Percent) |
|---|---|
| Glucose | 10.0 |
| Corn steep liquor | 1.85 |
| Casein hydrolysate (tryptone) | 1.25 |
| Yeast extract | 2.1 |
| Magnesium sulphate | 0.5 |
| Corn oil | 0.08 |
| Tap water, balance to 100%. | |

Culture is carried out with vigorous aeration and stirring, and with continuous adjustment of the pH between 7.2 and 7.3. A lag phase of 8 hours is observed and zeaxanthin production begins after 15 hours of culture. The temperature of the medium is adjusted to 24° C. after 24 hours of culture. 55 hours after the commencement of culture, the zeaxanthin content of the fermentation medium, determined as described previously, is 12 μg./ml.

Example 2

A culture is prepared of a strain of the *Flavobacter* genus (ATCC No. 21,081) in an aqueous nutrient medium, at pH, 6.5, having the following composition:

|   | (Percent) |
|---|---|
| Glucose | 3.0 |
| Yeast extract | 1.0 |
| Casein hydrolysate (tryptone) | 1.0 |
| Magnesium sulphate | 0.5 |
| Tap water, balance to 100%. | |

This culture, which contains 5 g. of microorganism cells per litre of nutrient medium, is then successively diluted in the ratio of 1:10$^8$ (by volume) in a sterile physiological solution containing 0.9% by weight of sodium chloride.

1 ml. of this solution is then carefully mixed, in a Petri dish, with 1 ml. of an aqueous solution of NTG containing 5 mg./ml. of NTG. 10 ml. of melted agar are then added and the agar and solution are thoroughly mixed. When the agar has solidified, the Petri dish is incubated at a temperature of 25 to 28° C., until colonies appear in the solidified medium, that is after 2 to 4 days. The colonies are then removed from the Petri dish and spread in several successive steps onto solid nutrient agar without NTG.

The resulting mutant strain is then inoculated at a level of 5% by volume into 100 ml. of a sterile nutrient medium, at pH 6.5, having the following composition:

| | (Percent) |
|---|---|
| Glucose | 3.0 |
| Yeast extract | 1.0 |
| Casein hydrolysate (tryptone) | 1.0 |
| Magnesium sulphate | 0.5 |
| Tap water, balance to 100%. | |

The microorganism is cultured aerobically in this medium at 28° C. for 24 hours, and the culture is then again inoculated into 2 litres of nutrient medium having the same composition. After 24 hours of fermentation under the same conditions, the latter culture is inoculated, at a level of 5% by volume, into an aqueous nutrient medium in a fermenter. This nutrient medium, having previously been sterilised at 120° C. for 40 minutes and cooled at 28° C., has a pH, adjusted with ammonia, between 6.9 and 7.1, and the following composition:

| | (Percent) |
|---|---|
| Glucose (separately sterilised in a concentrated solution) | 7.0 |
| Corn steep liquor | 1.6 |
| Casein hydrolysate (tryptone) | 0.8 |
| Yeast extract | 1.8 |
| Magnesium sulphate | 0.5 |
| Corn oil | 0.08 |
| Tap water, balance to 100%. | |

Culture is carried out in the fermenter at 28° C. with vigorous aeration and stirring, with automatic adjustment of the pH of the medium between 7.2 and 7.3. A lag phase of 5 to 6 hours is observed, and production of zeaxanthin begins after 12 hours of culture.

When the concentration of glucose in the medium has dropped, by decreasing values, to 25 mg./ml., that is 22 hours after the commencement of culture, the temperature of the medium is adjusted to 24° C. and a nutrient substrate, which has previously been sterilised and the pH adjusted to 7.2, is added at a rate such that the glucose content of the medium remains substantially constant. The substrate has the following composition:

| | (Percent) |
|---|---|
| Glucose | 32.0 |
| Corn steep liquor | 4.7 |
| Casein hydrolysate (tryptone) | 4.3 |
| Yeast extract | 5.5 |
| Tap water, balance to 100%. | |

This progressive addition is continued for 20 hours, the temperature of the medium being maintained at 24° C.

After a total of 48 hours of culture, the glucose concentration of the medium has dropped to 5 mg./ml., and its zeaxanthin content, determined as described in Example 1, is 335 µg./ml.

Example 3

A mutant of a *Flavobacter* strain (ATCC No. 21,081) is prepared as described in Example 2.

The mutant strain is then inoculated, at a level of 4% by volume, into a fermenter containing an aqueous nutrient medium previously sterilised at 120° C. for 40 minutes and cooled to 28° C. This nutrient medium, of which the pH is adjusted between 6.9 and 7.1 with ammonia, has the following composition:

| | (Percent) |
|---|---|
| Glucose | 7.0 |
| Corn steep liquor | 1.6 |
| Peanut cake hydrolysate | 0.7 |
| Yeast extract | 2.0 |
| Magnesium sulphate | 0.5 |
| Corn oil | 0.08 |
| Tap water, balance to 100%. | |

The microorganism is cultured in the fermenter at 28° C., as described in Example 2.

When the glucose concentration of the medium reaches 25 mg./ml., the temperature of the medium is adjusted to 24° C., and a nutrient substrate, previously sterilised and the pH of which has been adjusted to 7.2, is added progressively to maintain the glucose concentration substantially constant. The substrate has the following composition:

| | (Percent) |
|---|---|
| Glucose | 32.0 |
| Corn steep liquor | 4.7 |
| Peanut cake hydrolysate | 3.5 |
| Yeast extract | 6.0 |
| Tap water, balance to 100%. | |

This addition is continued for 20 hours at a temperature of 24° C.

After a total culture period of 51 hours, the glucose concentration of the medium has descended to 7.5 mg./ml. The zeaxanthin concentration, determined as described in Example 1, is 312 µg./ml.

Example 4

A culture of *Flavobacterium aquatile* ATCC No. 11947 is prepared and inoculated at a level of 5% into an aqueous nutrient medium in a fermenter. The nutrient medium, previously sterilised at 120° C. for 40 minutes and cooled to 28° C. and having a pH, adjusted with ammonia, between 6.9 and 7.1, has the following composition:

| | (Percent) |
|---|---|
| Glucose (separately sterilised in a concentrated solution) | 7.0 |
| Corn steep liquor | 1.6 |
| Casein hydrolysate (tryptone) | 0.8 |
| Yeast extract | 1.8 |
| Magnesium sulphate | 0.5 |
| Corn oil | 0.08 |
| Tap water, balance to 100%. | |

The microorganism is cultured in the fermenter at 28° C., with vigorous aeration and stirring, and with continuous adjustment of the pH of the medium between 7.2 and 7.3 by automatic addition of dilute aqueous ammonia.

Culture carried out under these conditions includes a lag phase of 6 to 7 hours, and production of zeaxanthin begins after 14 hours of culture.

When the glucose concentration of the fermentation medium drops, by decreasing values, to 25 mg./ml., that is 24 hours after the start of culture, the temperature of the medium is adjusted to 24° C. and a nutrient substrate which has been previously sterilised in a separate reservoir and of which the pH has been adjusted to 7.2, is progressively fed into the fermenter at a rate such that the glucose concentration of the medium remains substantially constant. The composition of the medium is as follows:

| | (Percent) |
|---|---|
| Glucose | 32.0 |
| Corn steep liquor | 4.7 |
| Casein hydrolysate (tryptone) | 4.3 |
| Yeast extract | 5.5 |
| Tap water, balance to 100%. | |

This progressive addition is continued for 20 hours, the temperature of the medium being maintained at 24° C.

After a total culture time of 50 hours, the zeaxanthin content of the fermentation medium is determined by thin-layer chromatography and U.V. spectroscopy.

The zeaxanthin content of the fermentation is found to be 16 µg./ml.

By way of comparison, the same strain is cultured by a conventional method. It is inoculated at a level of 5% by volume into the same amount of nutrient medium. The medium has previously been sterilised and cooled to 28° C. and the pH adjusted between 6.9 and 7.1; it has the following composition:

|   | (Percent) |
|---|---|
| Glucose | 10.0 |
| Corn steep liquor | 1.85 |
| Casein hydrolysate (tryptone) | 1.25 |
| Yeast extract | 2.1 |
| Magnesium sulphate | 0.5 |
| Corn oil | 0.08 |
| Tap water, balance to 100%. | |

Culture is carried out with vigorous aeration and stirring, and with continuous adjustment of the pH between 7.2 and 7.3. A lag phase of 8 hours is observed and zeaxanthin production begins after 15 hours of culture. The temperature of the medium is adjusted to 24° C. after 24 hours of culture. 55 hours after the commencement of culture, the zeaxanthin content of the fermentation medium, determined as described previously, is 12 µg./ml.

Example 5

A culture of *Flavobacterium aquatile* ATCC No. 11947 is prepared in an aqueous nutrient medium of which the pH is adjusted to 6.5 and having the following composition:

|   | (Percent) |
|---|---|
| Glucose | 3.0 |
| Yeast extract | 1.0 |
| Casein hydrolysate (tryptone) | 1.0 |
| Magnesium sulphate | 0.5 |
| Tap water, balance to 100%. | |

This culture, which contains 5 g. of microorganism cells per litre of nutrient medium, is then successively diluted in the ratio of $1:10^8$ (by volume) in a sterile physiological solution containing 0.9% by weight of sodium chloride.

1 ml. of this solution is then carefully mixed, in a petri dish, with 1 ml. of an aqueous solution of NTG containing 5 mg./ml. of NTG. 10 ml of melted agar are then added and the agar and solution are thoroughly mixed. When the agar has solidified, the petri dish is incubated at a temperature of 25 to 28° C. until colonies appear in the solidified medium, that is after 2 to 4 days. The colonies are then removed from the petri dish and spread in several successive steps onto solid nutrient agar without NTG.

The resulting mutant strain is then inoculated at a level of 5% by volume into 100 ml. of a sterile nutrient medium, at pH 6.5, having the following composition:

|   | (Percent) |
|---|---|
| Glucose | 3.0 |
| Yeast extract | 1.0 |
| Casein hydrolysate (tryptone) | 1.0 |
| Magnesium sulphate | 0.5 |
| Tap water, balance to 100%. | |

The microorganism is cultured aerobically in this medium at 28° C. for 24 hours, and the culture is then again inoculated into 2 litres of nutrients medium having the same composition. After 24 hours of fermentation under the same conditions, the latter culture is inoculated, at a level of 5% by volume, into an aqueous nutrient medium in a fermenter. This nutrient medium, having previously been sterilised at 120° C. for 40 minutes and cooled at 28° C. has a pH, with ammonia, between 6.9 and 7.1, and the following composition:

|   | (Percent) |
|---|---|
| Glucose (separately sterilised in a concentrated solution) | 7.0 |
| Corn steep liquor | 1.6 |
| Casein hydrolysate (tryptone) | 0.8 |
| Yeast extract | 1.8 |
| Magnesium sulphate | 0.5 |
| Corn oil | 0.08 |
| Tap water, balance to 100%. | |

When the concentration of glucose in the medium has dropped, by decreasing values, to 25 mg./ml. that is 22 hours after the commencement of culture, the temperature of the medium is adjusted to 24° C., and a nutrient substrate, which has previously been sterilised and the pH adjusted to 7.2, is added at a rate such that the glucose content of the medium remains substantially constant. The substrate has the following composition:

|   | (Percent) |
|---|---|
| Glucose | 32.0 |
| Corn steep liquor | 4.7 |
| Casein hydrolysate (tryptone) | 4.3 |
| Yeast extract | 5.5 |
| Tap water, balance to 100%. | |

This progressive addition is continued for 20 hours, the temperature of the medium being maintained at 24° C.

After a total of 48 hours of culture, the glucose concentration of the medium has dropped to 5 mg./ml., and its zeaxanthin content, determined as described in Example 4, is 40 µg./ml.

We claim:

1. A process for preparing zeaxanthin by culture of a zeaxanthin-producing microorganism of the *Flavobacter* genus in which:
   (a) the microorganism is first cultured in a nutrient medium therefor until cells in a state of growth and zeaxanthin production are obtained and
   (b) the cells are then cultured, at a temperature of 22 to 25° C. and with sufficient oxygenation, in an aqueous nutrient medium therefor containing at least one carbohydrate, at a level of 15 to 35 mg./ml., as assimilable carbon source and at least one source of assimilable amino nitrogen containing free amino acids, during the culture the respective amounts of carbon and nitrogen source present in the medium are maintained in a substantially constant ratio by adding these substances, and culture is continued until a substantial amount of zeaxanthin is accumulated in the medium.

2. A process according to claim 1, in which the nutrient medium employed for culture in step (a) contains more than 35 mg./ml. of assimilable carbon source comprising at least one carbohydrate, the total carbohydrate content of the medium is allowed to decrease to a level between 15 and 35 mg./ml., and thereafter culture is continued in accordance with step (b) at a temperature of 22 to 25° C.

3. A process according to claim 2, in which the microorganism is a mutant of a zeaxanthin-producing bacterium of the *Flavobacter* genus.

4. A process according to claim 3, in which the mutant is obtained by the action in a solidified medium of 1-methyl-3-nitro-1-nitroso-guanidine on the bacterium of the genus *Flavobacter*.

5. A process according to claim 2, in which the microorganism is selected from the bacteria *Flavorbacter* ATCC No. 21081, *Flavobacter* ATCC No. 21588 and mutants thereof.

6. A process according to claim 2, in which the microorganism is *Flavobacterium aquatile* ATCC No. 11947 or a mutant thereof.

7. A process according to claim 2, in which the medium employed in the culture of step (a) initially contains 6 to 8% by weight of assimilable carbon source.

8. A process according to claim 2, in which during the culture of step (b), amounts of carbohydrate and amino nitrogen source are added to the culture medium so as to maintain a weight ratio between 1.6 and 3.4 to 1, respectively therebetween.

9. A process according to claim 8, in which the pH of the medium is maintained between 6.5 and 8.0.

10. A process according to claim 8, in which the carbohydrate is glucose, lactose or sucrose.

11. A process according to claim 8, in which the source of amino nitrogen comprises at least one of ammonia, corn steep liquor, yeast extract, a protein hydrolysate and a hydrolysate of a *Flavobacter* biomass.

12. A process according to claim 8, in which the microorganism is a mutant of a zeaxanthin-producing bacterium of the *Flavobacter* genus.

13. A process according to claim 12, in which the mutant is obtained by the action in a solidified medium of 1-methyl-3-nitro-1-nitroso-guanidine on the bacterium of the genus *Flavobacter*.

14. A process according to claim 8, in which the microorganism is selected from the bacteria: *Flavobacter* ATCC No. 21081, *Flavobacter* ATCC No. 21588 and mutants thereof.

15. A process according to claim 8, in which the microorganism is *Flavobacterium aquatile* ATCC No. 11947 or a mutant thereof.

16. A process according to claim 8, in which, following the culture of step (b), zeaxanthin is solvent-extracted from the microorganism cells.

17. A process according to claim 16, in which the solvent employed to extract zeaxanthin is a polar organic solvent selected from the group consisting of acetone, ethanol, and chloroform.

18. A process according to claim 8, in which, following step (b), the microorganism cells are separated from the culture medium.

References Cited

Chemical Abstracts, Vol. 51, 7497h, 1957.

A. LOUIS MONACELL, Primary Examiner

R. J. WARDEN, Assistant Examiner

UNITED STATES PATENT OFFICE
CERTIFICATE OF CORRECTION

Patent No. 3,841,967                    Dated October 15, 1974

Inventor(s) Jaroslav DASEK, David SHEPHERD and Knut Rude TRAELNES

It is certified that error appears in the above-identified patent and that said Letters Patent are hereby corrected as shown below:

In Column 1, line 9, "Claims priority, application Sweden, Oct. 27, 1971," should read --Claims priority, applications Switzerland, Oct. 27, 1971,--.

Signed and sealed this 27th day of May 1975.

(SEAL)
Attest:

RUTH C. MASON
Attesting Officer

C. MARSHALL DANN
Commissioner of Patents
and Trademarks